(12) United States Patent
Hosotani

(10) Patent No.: US 11,909,310 B2
(45) Date of Patent: Feb. 20, 2024

(54) SWITCHING POWER SUPPLY DEVICE

(71) Applicant: Murata Manufacturing Co., Ltd., Kyoto-fu (JP)

(72) Inventor: Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 490 days.

(21) Appl. No.: 17/125,729

(22) Filed: Dec. 17, 2020

(65) Prior Publication Data

US 2021/0104351 A1    Apr. 8, 2021

Related U.S. Application Data

(63) Continuation of application No. PCT/JP2019/007489, filed on Feb. 27, 2019.

(30) Foreign Application Priority Data

Aug. 17, 2018 (JP) .................. 2018-153375

(51) Int. Cl.
*H02M 3/158* (2006.01)
*H02M 3/00* (2006.01)
*H01F 17/00* (2006.01)

(52) U.S. Cl.
CPC ........ *H02M 3/003* (2021.05); *H01F 17/0006* (2013.01); *H02M 3/1584* (2013.01);
(Continued)

(58) Field of Classification Search
CPC .. H01F 27/245; H01F 27/2804; H01F 41/041; H01F 2017/0066;
(Continued)

(56) References Cited

U.S. PATENT DOCUMENTS 9,373,438 B1 * 6/2016 Ikriannikov ............ H01F 38/08
2006/0181252 A1 * 8/2006 Yoshida .............. H01F 27/2804
363/131

(Continued)

FOREIGN PATENT DOCUMENTS

CN       104254896 A    12/2014
JP       H06-77055 A     3/1994
(Continued)

OTHER PUBLICATIONS

International Search Report issued in PCT/JP2019/007489; dated Apr. 16, 2019.

(Continued)

*Primary Examiner* — Alex Torres-Rivera
(74) *Attorney, Agent, or Firm* — Studebaker & Brackett PC

(57) ABSTRACT

A switching power supply device includes a power conversion circuit that is provided at a multilayer printed board and includes a plurality of switching circuits and a controller controlling the switching circuits, windings configuring an inductor at the multilayer printed board, and a magnetic sheet on one or both of upper and lower faces of the multilayer printed board. First ends of the windings are connected to the switching circuits, and second ends of the windings are connected to a common output. The controller controls the plurality of switching circuits to periodically vary a position and a time at which magnetic flux generated by current flowing to the windings reaches the maximum magnetic flux density. Thus, the switching power supply device is thin, achieves dispersion of heat generation, handles variations in the magnitude of electric power by varying the area of the board, and effectively reduces unwanted radiation.

22 Claims, 15 Drawing Sheets

(52) U.S. Cl.
CPC ........... *H01F 2017/0066* (2013.01); *H01F 2017/0073* (2013.01)

(58) Field of Classification Search
CPC ........ H01F 2017/0073; H01F 17/0006; H02M 3/01; H02M 1/0043; H02M 3/1584; H02M 3/335
See application file for complete search history.

(56) References Cited

U.S. PATENT DOCUMENTS

| | | | | |
|---|---|---|---|---|
| 2007/0030659 A1* | 2/2007 | Suzuki | ............... | H05K 1/165 336/200 |
| 2009/0051476 A1 | 2/2009 | Tada et al. | | |
| 2015/0084422 A1* | 3/2015 | Ishigaki | ............ | H02M 7/4837 307/43 |
| 2017/0352471 A1* | 12/2017 | Mano | ............... | H01F 41/005 |

FOREIGN PATENT DOCUMENTS

| | | | |
|---|---|---|---|
| JP | 2000260639 A | 9/2000 | |
| JP | 2015073052 A | 4/2015 | |
| JP | 2016197987 A | 11/2016 | |
| WO | 2017217250 A1 | 12/2017 | |

OTHER PUBLICATIONS

International Preliminary Report on Patentability and Written Opinion issued in PCT/JP2019/007489; dated Feb. 23, 2021.

* cited by examiner

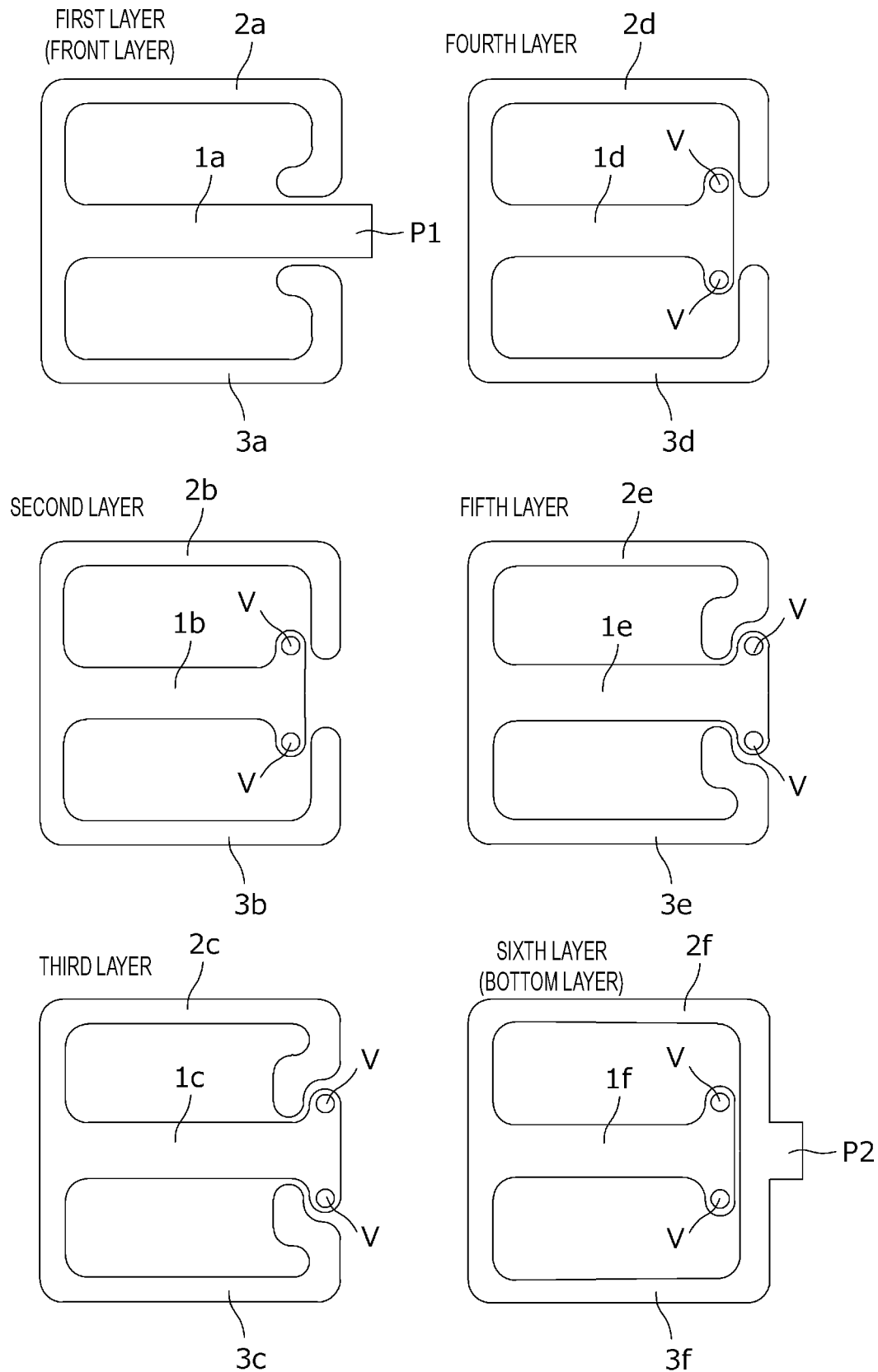

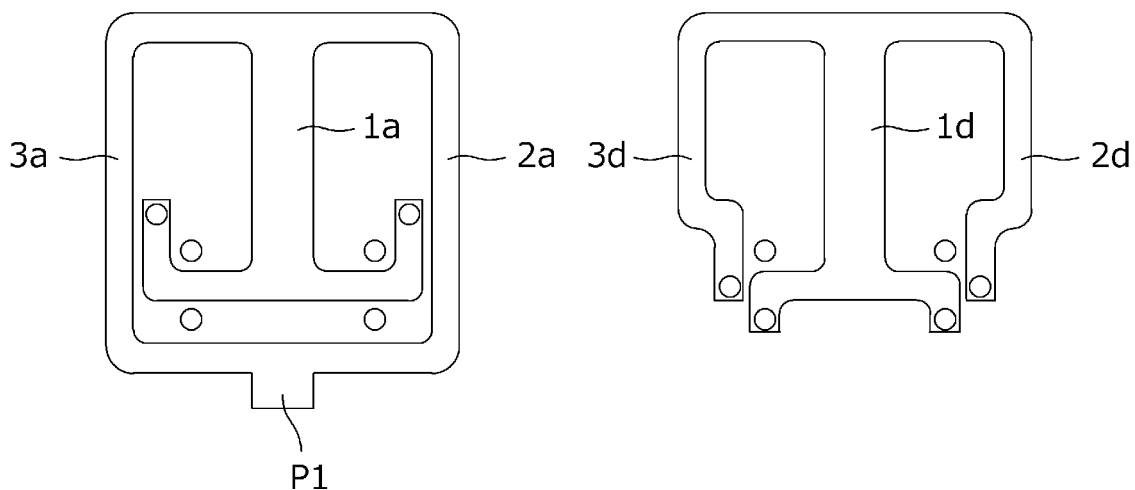
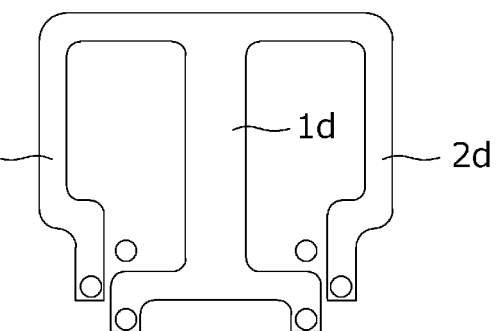
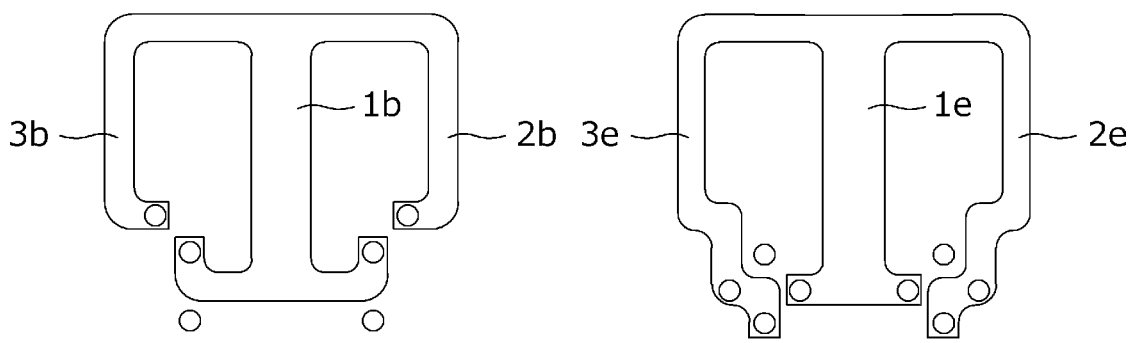
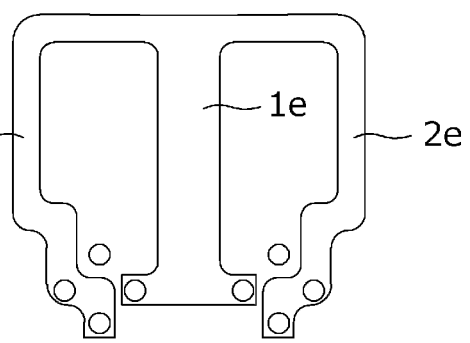
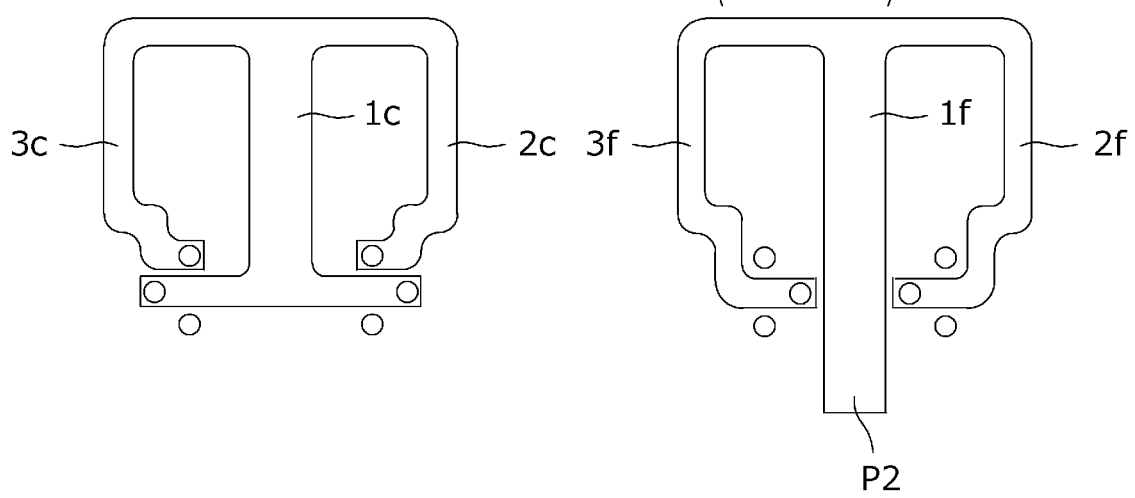
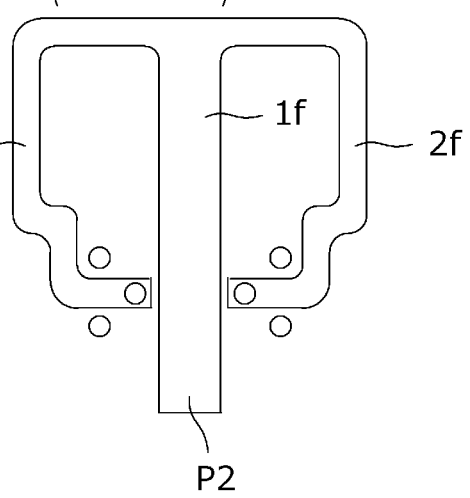
FIG. 7

SWITCHING POWER SUPPLY DEVICE

This application claims benefit of priority to International Patent Application No. PCT/JP2019/007489, filed Feb. 27, 2019, and to Japanese Patent Application No. 2018-153375, filed Aug. 17, 2018, the entire contents of each are incorporated herein by reference.

BACKGROUND

Technical Field

The present disclosure relates to a switching power supply device that includes a planar array inductor including a plurality of inductors arranged on a plane and operates in multiple phases.

Background Art

An inductor with a structure in which a winding having a conductor pattern is formed at a multilayer board and a magnetic core made of ferrite or the like is embedded in the multilayer board and a switching power supply device including the inductor are disclosed in Japanese Unexamined Patent Application Publication No. 2000-260639. Furthermore, an inductor array of a multilayer type in which a plurality of windings are laminated is disclosed in Japanese Unexamined Patent Application Publication No. 2015-73052.

SUMMARY

In the switching power supply device described in Japanese Unexamined Patent Application Publication No. 2000-260639, windings having conductor patterns are formed at a board. Thus, the thickness of a large part of the switching power supply device is reduced. However, even if a magnetic core is arranged over both faces of the board, the maximum thickness of the switching power supply device is restricted according to the thickness of the magnetic core itself. Therefore, there is a limit to the extent to which the thickness of the entire switching power supply device can be reduced.

Furthermore, in a switching power supply device that includes inductors including individual magnetic cores separated from one another, a heat dissipation area is small, and this causes a problem of concentration of heat generation and increase in temperature. Moreover, in the case where an inductor having a structure including an embedded magnetic core is used, the manufacturing process for the product is complicated, and production is thus complicated. Therefore, the sizes of the inductor and the magnetic core are determined according to electric power specifications. Accordingly, the number of product line-ups increases in accordance with variations in specifications. Due to the increase in the number of product line-ups, not only the production process but manufacturing management of products also becomes complicated. Thus, there is such a problem in terms of productivity.

Meanwhile, the inductor array described in Japanese Unexamined Patent Application Publication No. 2015-73052 is a multilayer inductor having an air-core structure in which a plurality of helical inductors are stacked such that winding axes of the inductors are coincident with each other. In the case where such an inductor array is used in a switching power supply device including a plurality of DC-DC converter circuits, there is a problem of unwanted radiation of a magnetic field to the outside. Furthermore, in order to use such an inductor array for a switching power supply device including a plurality of DC-DC converter circuits, the number of turns of a winding needs to be increased so that a predetermined inductance can be obtained. Accordingly, there is also a problem in terms of productivity because, for example, a board having many layers is required.

Thus, the present disclosure provides a switching power supply device operating in multiple phases that is easily configured to be thin, easily achieves dispersion of heat generation, handles variations in the magnitude of electric power by varying the size of the area of a board, and effectively reduces unwanted radiation.

A switching power supply device according to an example of the present disclosure includes a power conversion circuit that is provided at a multilayer printed board and includes a plurality of switching circuit units and a control unit controlling the plurality of switching circuit units, a plurality of windings that are formed at the multilayer printed board, each of the plurality of windings configuring an inductor having a first end and a second end, and a magnetic sheet that is provided on one or both of an upper face of the multilayer printed board and a lower face of the multilayer printed board, the magnetic sheet being made of a soft magnetic body forming a magnetic layer. The plurality of windings have conductor patterns formed at the multilayer printed board. The plurality of windings are arranged along a plane of the multilayer printed board. The first ends of the plurality of windings are connected to the plurality of switching circuit units, and the second ends of the plurality of windings are connected to a common output part. The control unit controls the plurality of switching circuit units to periodically vary a position and a time at which magnetic flux generated by current flowing to the plurality of windings reaches maximum magnetic flux density.

In the switching power supply device mentioned above, compact windings having predetermined inductances can be formed by operation of high permeability of the magnetic sheet. With the magnetic sheet functioning as a magnetic path, the magnetic path for magnetic flux generated by a winding can be shortened, and unwanted radiation can thus be reduced. Furthermore, with an air core structure of a winding itself, the structure of the winding can be simplified, excellent productivity can be achieved, and the cost can be reduced. Moreover, there is no need to provide a magnetic core for each winding, and an unseparated magnetic sheet is used. Thus, high productivity can be achieved compared to a case where magnetic bodies for individual windings are used.

According to the present disclosure, a compact switching power supply device that effectively reduces unwanted radiation can be obtained.

BRIEF DESCRIPTION OF THE DRAWINGS

FIG. 4 is an exploded plan view illustrating a structure of a winding of the planar array winding according to this embodiment;

FIG. 7 is an exploded plan view illustrating another structure of a winding of the planar array winding according to the second embodiment;

DETAILED DESCRIPTION

First Embodiment

Figure 1A:
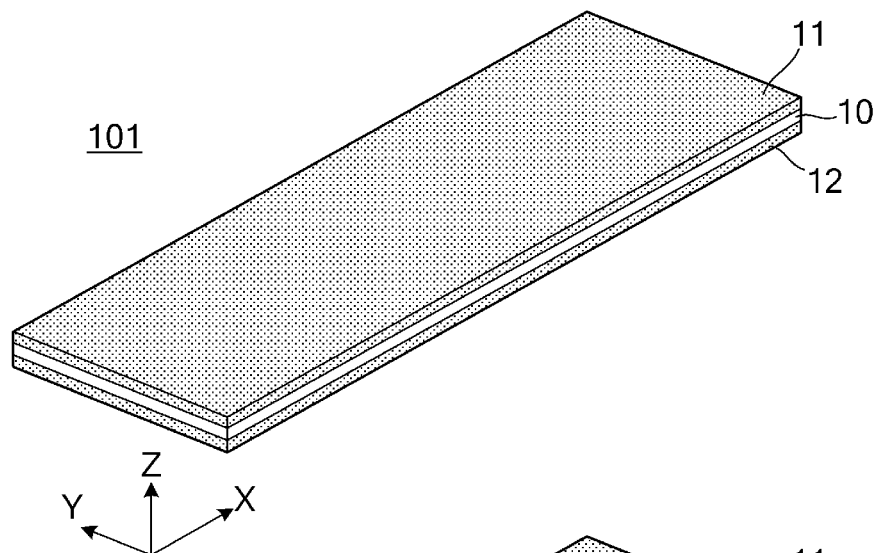
FIG. 1A is a perspective view of a planar array winding provided in a switching power supply device according to a first embodiment.
Figure 1B:
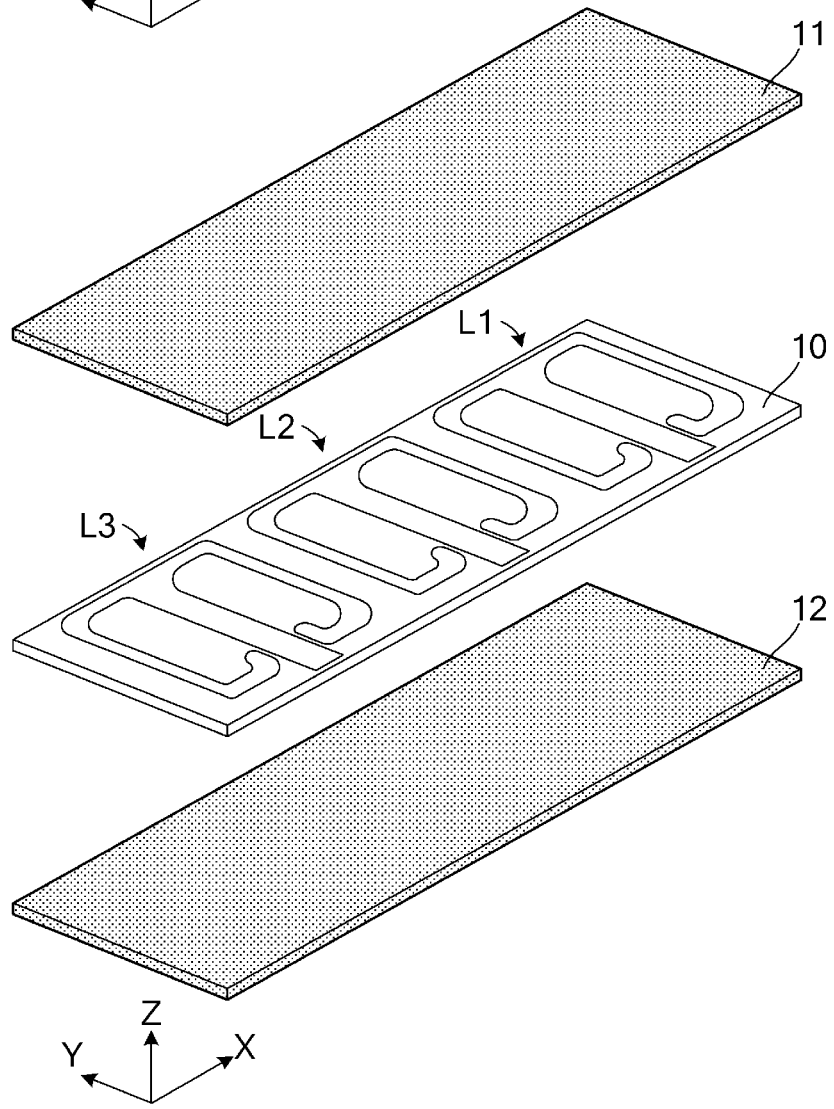
FIG. 1B is an exploded perspective view of the planar array winding.

FIG. 1A is a perspective view of a planar array winding 101 provided in a switching power supply device according to a first embodiment. FIG. 1B is an exploded perspective view of the planar array winding 101.

The planar array winding 101 includes a multilayer printed board 10 and magnetic sheets 11 and 12.

A plurality of windings are arranged along a plane of the multilayer printed board 10. With this arrangement, a planar array winding is configured at the multilayer printed board 10. As described later, these windings are connected to a power conversion circuit including a plurality of switching circuit units that perform switching at different phases.

As illustrated in FIG. 1A, the multilayer printed board 10 has a flat plate shape having a longer direction (X-axis direction) and a shorter direction (Y-axis direction). Windings L1, L2, and L3 are arranged along the longer direction of the multilayer printed board 10. A region including the windings L1, L2, and L3 is formed along a flat plate region of the multilayer printed board 10 and is in parallel to the magnetic sheets 11 and 12. Accordingly, distances between conductor patterns of the windings L1, L2, and L3 and the magnetic sheets 11 and 12 are substantially the same, and magnetic paths formed of the conductor patterns have substantially the same size.

As illustrated in FIG. 1A, the magnetic sheet 11 is overlaid on the upper face of the multilayer printed board 10, and the magnetic sheet 12 is overlaid on the lower face of the multilayer printed board 10. The magnetic sheets 11 and 12 are each formed of a member including a magnetic material made of a soft magnetic body and molded into a sheet shape. The magnetic sheets 11 and 12 operate as magnetic paths for magnetic flux passing through winding openings. The magnetic sheets 11 and 12 also operate as magnetic shield layers. Materials and configuration of the magnetic sheets 11 and 12 will be described later.

Figure 2:
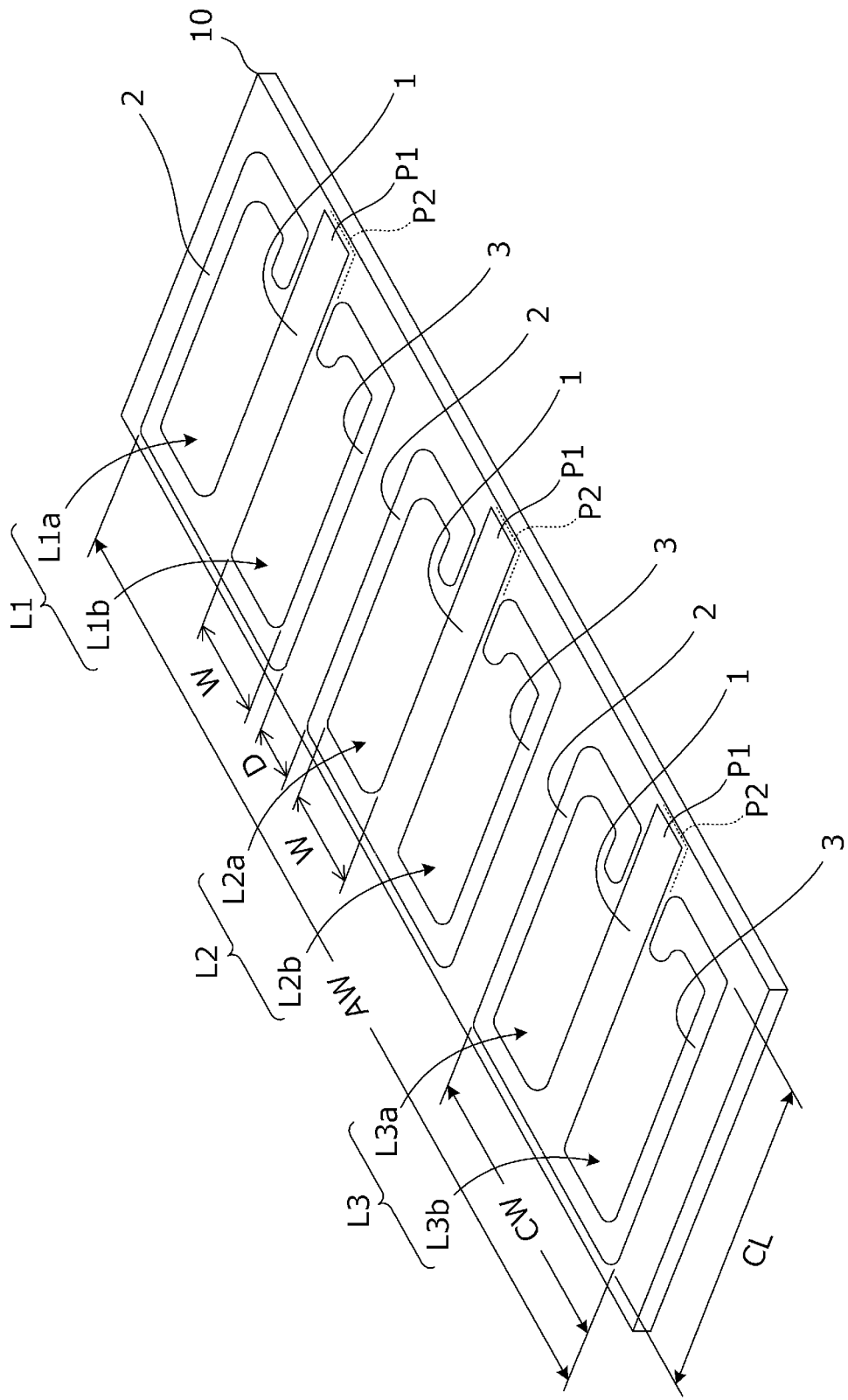
FIG. 2 is a perspective view illustrating patterns of windings formed at a multilayer printed board.
Figure 3A:
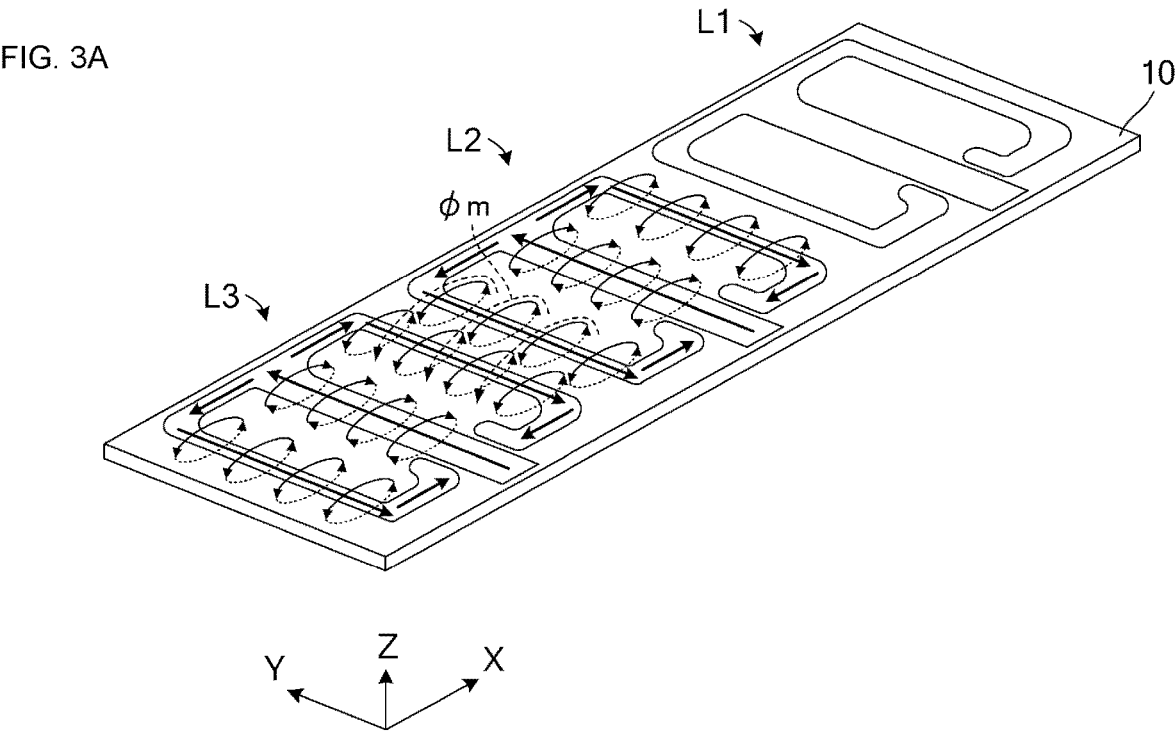
FIG. 3A is a perspective view illustrating a state of current flowing in individual windings of the planar array winding provided in the switching power supply device according to the first embodiment and generated magnetic flux.
Figure 3B:
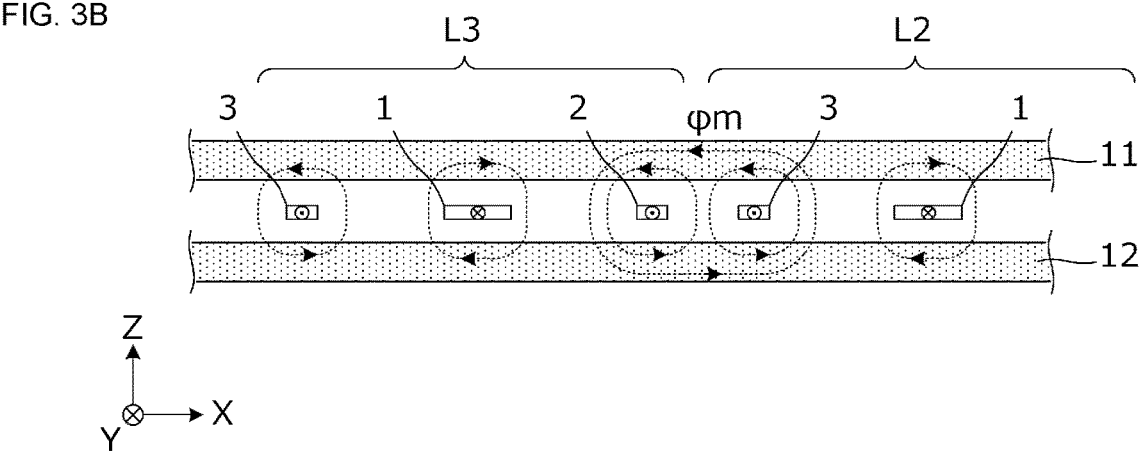
FIG. 3B is a cross-section view of the state illustrated in FIG. 3A.

FIG. 2 is a perspective view illustrating patterns of windings formed at the multilayer printed board 10. FIG. 3A is a perspective view illustrating a state of current flowing in individual windings of the planar array winding 101 and generated magnetic flux, and FIG. 3B is a cross-section view of the state illustrated in FIG. 3A. In FIG. 3A, illustration of the magnetic sheets 11 and 12 is omitted. In FIG. 3B, illustration of the multilayer printed board 10 is omitted, and conductor patterns at a single layer is illustrated.

The plurality of windings L1, L2, and L3 are formed at the multilayer printed board 10 of the planar array winding 101 according to this embodiment. First ends P1 of the windings L1, L2, and L3 are connected to switching circuit units of a power conversion circuit, and second ends P2 are connected to a common output part. The detailed structure of the individual windings and the power conversion circuit will be described later.

The windings L1, L2, and L3 have conductor patterns formed at the multilayer printed board 10 and are arranged along a plane of the multilayer printed board 10.

Furthermore, the winding L1 includes two winding parts L1a and L1b, the winding L2 includes two winding parts L2a and L2b, and the winding L3 includes two winding parts L3a and L3b. The winding part L1a includes a central conductor pattern 1 and a ring-shaped conductor pattern 2 of the winding L1, and the winding part L1b includes the central conductor pattern 1 and a ring-shaped conductor pattern 3 of the winding L1. In a similar manner, the winding part L2a includes the central conductor pattern 1 and the ring-shaped conductor pattern 2 of the winding L2, and the winding part L2b includes the central conductor pattern 1 and the ring-shaped conductor pattern 3 of the winding L2. Furthermore, the winding part L3a includes the central conductor pattern 1 and the ring-shaped conductor pattern 2 of the winding L3, and the winding part L3b includes the central conductor pattern 1 and the ring-shaped conductor pattern 3 of the winding L3. Winding openings of adjacent windings are arranged not to overlap.

The conductor patterns 1, 2, and 3 of the winding L1 are formed to extend along the shorter direction (Y-axis direction) of the multilayer printed board 10 and are arranged along the longer direction (X-axis direction) of the multilayer printed board 10. In a similar manner, the conductor patterns 1, 2, and 3 of the winding L2 are formed to extend along the shorter direction (Y-axis direction) of the multilayer printed board 10 and are arranged along the longer direction (X-axis direction) of the multilayer printed board 10. Furthermore, the conductor patterns 1, 2, and 3 of the winding L3 are formed to extend along the shorter direction (Y-axis direction) of the multilayer printed board 10 and are arranged along the longer direction (X-axis direction) of the multilayer printed board 10.

Sizes and the like of the individual parts illustrated in FIG. 2 are, for example, as described below.
[Conductor Pattern]
Thickness: 0.07 mm
Width CW of winding part: 10 mm
Length CL of winding part: 14 mm
Width AW of all windings: 36 mm
Distance D between one winding parts: 2 mm
Opening width W of winding part: 3.3 mm
[Magnetic Sheet]
Relative permeability μ': 1000
Thickness MT: 20 μm Straight-line arrows in FIG. 3A and dot symbols and cross symbols in FIG. 3B represent directions of current flowing in the winding parts at certain phases (timings). That is, currents in the winding parts L1a and L1b of the winding L1 flow in opposite rotation directions. In a similar manner, currents in the winding parts L2a and L2b of the winding L2 flow in opposite rotation directions, and currents in the winding parts L3a and L3b of the winding L3 flow in opposite rotation directions.

Furthermore, the windings L1, L2, and L3 are arranged such that one winding parts of the two winding parts are adjacent to each other. Specifically, the winding part L1b of the winding L1 and the winding part L2a of the winding L2 are adjacent to each other, and the winding part L2b of the winding L2 and the winding part L3a of the winding L3 are adjacent to each other.

The windings L1, L2, and L3 are connected such that operation of switching circuits causes currents in regions of adjacent winding parts that extend in parallel to each other to flow in the same direction. In the example represented by the arrows in FIG. 3A, currents in regions of the adjacent winding parts that extend in parallel to each other in the Y-axis direction flow in the same direction.

As illustrated in FIG. 3B, magnetic flux generated around the conductor patterns 1, 2, and 3 of the winding parts passes through the magnetic sheets 11 and 12 along the plane direction of the magnetic sheets 11 and 12. That is, regions of the magnetic sheets 11 and 12 in which windings are adjacent to each other operate as magnetic paths for the windings. Furthermore, magnetic flux passing through winding openings of the windings is confined in the magnetic sheets 11 and 12. Thus, the magnetic sheets 11 and 12 operate as magnetic shield layers. It is desirable that the thickness MT of a magnetic sheet satisfies the relationship of MT≥W/(2μ'), based on the dimensional relationship among the opening width W of a winding part, the relative permeability μ' of the magnetic sheet, and the thickness MT of the magnetic sheet, by taking into consideration the magnetic flux density of magnetic flux generated around a conductor pattern of the winding part by current flowing to the conductor pattern of the winding part. For example, to achieve a thinner magnetic sheet, the thickness MT of the magnetic sheet is set to W/(2μ').

In the planar array winding 101 according to this embodiment, even if magnetic flux φm interlinked with adjacent winding parts is generated, currents flowing in the adjacent winding parts are not canceled out by the magnetic flux φm. That is, magnetic coupling between adjacent two winding parts via magnetic flux does not produce adverse effect. Thus, the distance between adjacent windings can be reduced, and this arrangement can reduce the size of an array winding. In the example illustrated in FIG. 2, the distance D between one winding parts of the windings L1, L2, and L3 is smaller than the opening width W of the winding parts in the direction of the distance D.

FIG. 4 is an exploded plan view illustrating a structure of a winding of the planar array winding 101 according to this embodiment. This is an example of a case where a printed board is manufactured using a build-up method. In this example, only winding conductor patterns formed at individual layers of the multilayer printed board 10 are illustrated. The windings L1, L2, and L3 illustrated in FIG. 2 have the same configuration.

As illustrated in FIG. 4, a central conductor pattern 1a and ring-shaped conductor patterns 2a and 3a are formed at a first layer, which is a front layer. In a similar manner, a central conductor pattern 1b and ring-shaped conductor patterns 2b and 3b are formed at a second layer, a central conductor pattern 1c and ring-shaped conductor patterns 2c and 3c are formed at a third layer, a central conductor pattern 1d and ring-shaped conductor patterns 2d and 3d are formed at a fourth layer, and a central conductor pattern 1e and ring-shaped conductor patterns 2e and 3e are formed at a fifth layer. Furthermore, a central conductor pattern 1f and ring-shaped conductor patterns 2f and 3f are formed at a sixth layer, which is a bottom layer. Each of the central conductor patterns 1a to 1f has a linear shape (line segment shape), and each of the ring-shaped conductor patterns 2a to 2f and 3a to 3f is a conductor pattern with less than one turn.

The build-up method includes processes described below.

Insulation layer formation process: An insulation layer is formed by superimposing insulation sheets covered with copper foils (RCC: Resin Coated Copper Foil) on each other or applying and solidifying a resin on a board.

Via machining process: A via hole is drilled in the insulation layer configuring the board by laser machining or photolithography.

Desmear process: Resin smear caused by the via machining process is removed.

Via plating process: Wiring layers are connected by forming conductors at an inner surface or the whole inside of the hole drilled in the insulation sheet by electroless plating or electroplating.

For example, the third layer and the fourth layer illustrated in FIG. 4 correspond to both faces of an insulation sheet with both faces covered with copper foils (core layers), the first layer and the second layer are layers laminated above the core layers, and the fifth layer and the sixth layer are layers laminated below the core layers.

End portions of the ring-shaped conductor patterns 2a and 3a at the first layer and end portions of the central conductor pattern 1b at the second layer are connected through vias V in the second layer. End portions of the ring-shaped conductor patterns 2b and 3b at the second layer and end portions of the central conductor pattern 1c at the third layer are connected through vias V in the third layer. In a similar manner, end portions of the ring-shaped conductor patterns 2c and 3c at the third layer and end portions of the central conductor pattern 1d at the fourth layer are connected through vias V in the fourth layer, and end portions of the ring-shaped conductor patterns 2d and 3d at the fourth layer and end portions of the central conductor pattern 1e at the fifth layer are connected through vias V in the fifth layer. Furthermore, end portions of the ring-shaped conductor patterns 2e and 3e at the fifth layer and end portions of the central conductor pattern 1f at the sixth layer are connected through vias V in the sixth layer.

Of base material layers at which winding conductor patterns are formed, winding conductor patterns at intermediate layers (the second to fifth layers) sandwiched between the bottom layer and the front layer include winding conductor patterns of two types. The winding conductor patterns of two types are arranged alternately in a direction in which the base material layers are laminated. In the example illustrated in FIG. 4, winding conductor patterns of the first type are formed at the second and fourth layers, and winding conductor patterns of the second type are formed at the third and fifth layers.

An end portion of the central conductor pattern 1*a* at the first layer is drawn as a first end P1, and end portions of the ring-shaped conductor patterns 2*f* and 3*f* at the sixth layer are connected and drawn as a second end P2.

Figure 5:
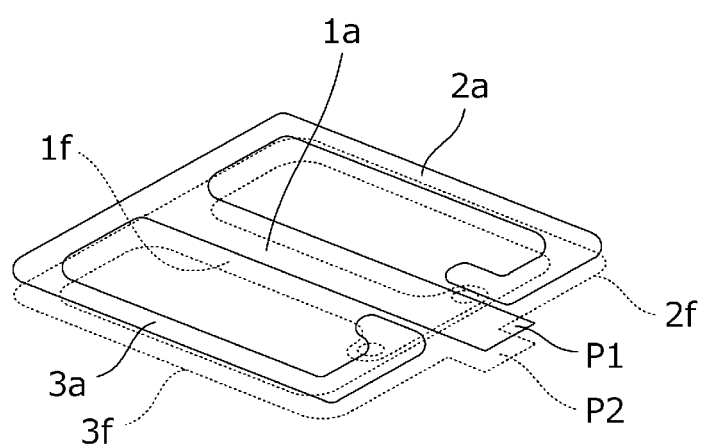
FIG. 5 is a perspective view simply representing a state in which conductor patterns at individual layers illustrated in FIG. 4 are laminated.

FIG. 5 is a perspective view simply illustrating a state in which conductor patterns at the individual layers illustrated in FIG. 4 are laminated. Most parts of the central conductor patterns 1*a* to if at the individual layers overlap when viewed in plan. Furthermore, most parts of one ring-shaped conductor patterns 2*a* to 2*f* at the individual layers overlap when viewed in plan, and most parts of the other ring-shaped conductor patterns 3*a* to 3*f* at the individual layers overlap when viewed in plan. Moreover, in this example, the first end P1 and the second end P2 overlap when viewed in plan.

With the windings having the conductor patterns illustrated in FIGS. 4 and 5, when voltage is applied between the first end P1 and the second end P2, current flows in the directions illustrated in FIGS. 3A and 3B, and magnetic flux is thus generated.

Examples of materials and properties of the magnetic sheets 11 and 12 will be described below.

Figure 16:
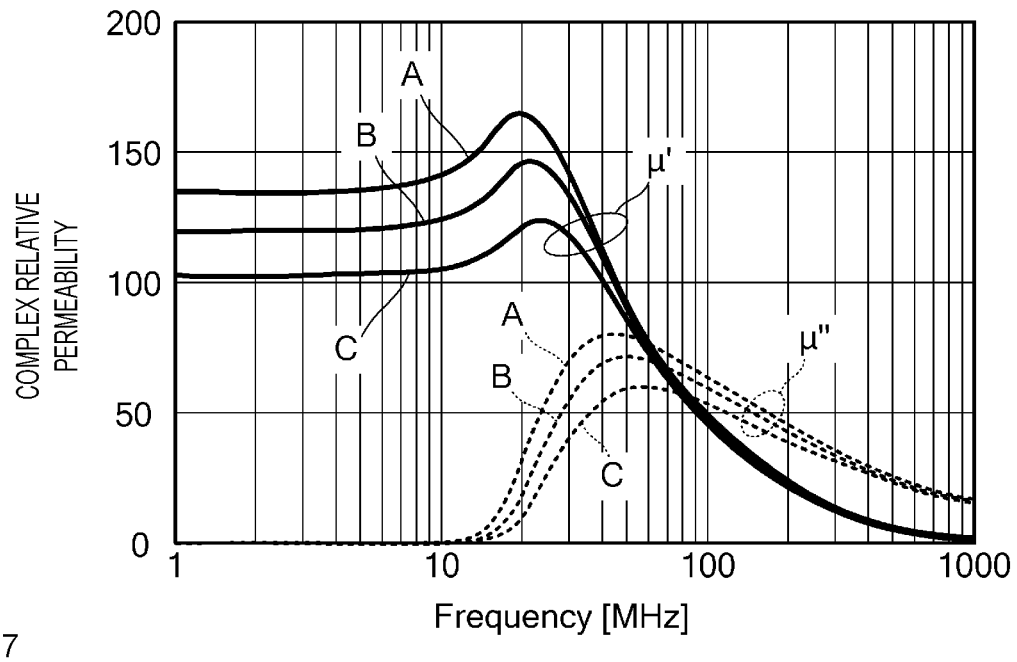
FIG. 16 is a diagram illustrating an example of properties of magnetic materials used for magnetic sheets.

FIG. 16 is a diagram illustrating frequency characteristics of complex relative permeability for examples of three magnetic materials suitable for the 13.56 MHz band. In FIG. 16, μ' represents a real part of the complex relative permeability, and μ" represents an imaginary part of the complex relative permeability. The three magnetic materials are Ni—Zn—Cu ferrite sintered bodies. In FIG. 16, in the 13.56 MHz band, the three magnetic materials represented by A, B, and C have high permeability characteristics with μ' of about 110 to about 130 and low loss characteristics with μ" of about 1 to about 3.

Figure 17:
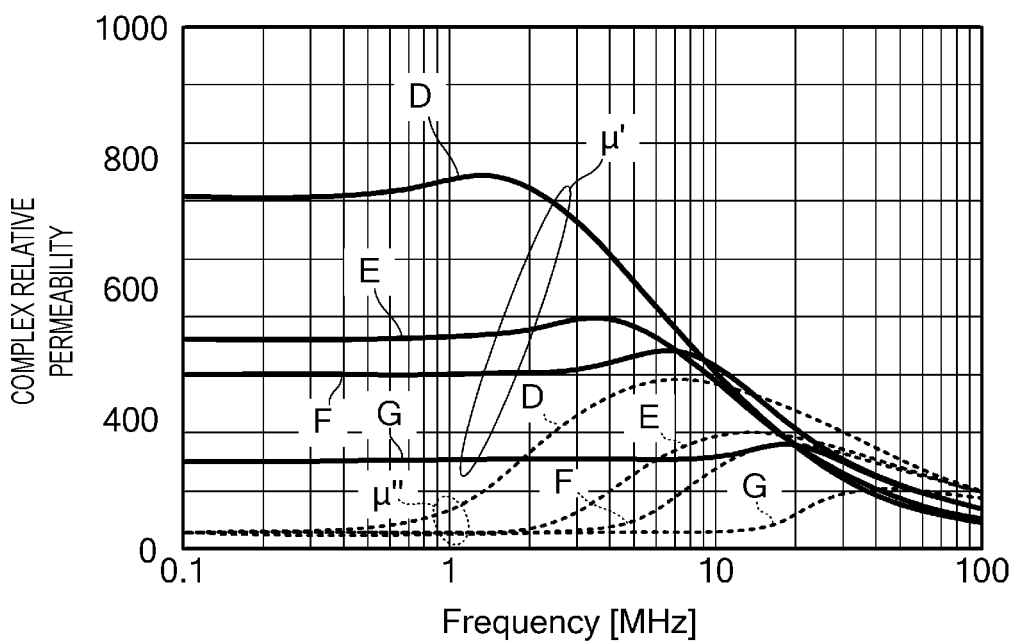
FIG. 17 is a diagram illustrating an example of properties of magnetic materials used for magnetic sheets.

FIG. 17 is a diagram illustrating frequency characteristics of complex relative permeability for examples of four magnetic materials suitable for the 100 kHz band. In FIG. 17, μ' represents a real part of the complex relative permeability, and μ" represents an imaginary part of the complex relative permeability. The four magnetic materials are Ni—Zn—Cu ferrite sintered bodies. In FIG. 17, in the 100 kHz band, the four magnetic materials represented by D, E, F, and G have high permeability characteristics with μ' of about 140 to about 660 and low loss characteristics with μ" of about 1 to about 3.

In the case where the switching frequency falls within a range from 1 MHz band to 10 MHz band, it is desirable that magnetic materials for the magnetic sheets 11 and 12 are Ni—Zn—Cu sintered ferrite materials with the maximum relative permeability at a frequency of 10 MHz or more, as illustrated in FIG. 16. Furthermore, in the case where the switching frequency falls within a range from 100 kHz band to 1 MHz band, it is desirable that magnetic materials for the magnetic sheets 11 and 12 are Ni—Zn—Cu sintered ferrite materials with the maximum relative permeability at a frequency of 1 MHz or more, as illustrated in FIG. 17.

Figure 18:
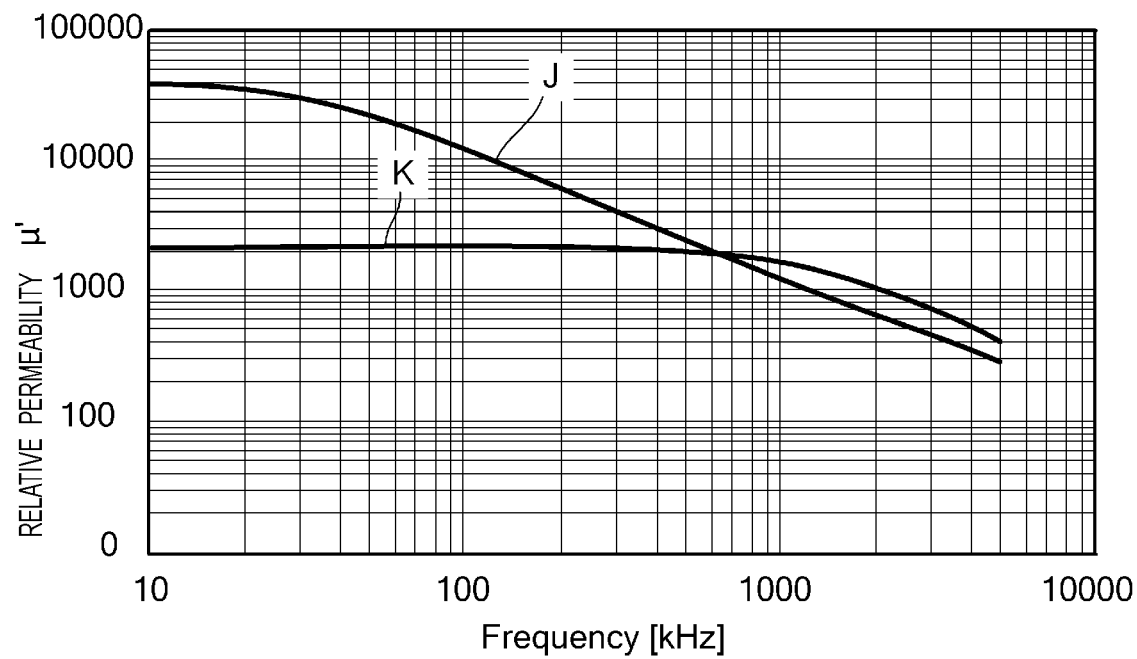
FIG. 18 is a diagram illustrating an example of properties of magnetic materials used for magnetic sheets.

FIG. 18 is a diagram illustrating frequency characteristics of relative permeability for examples of two magnetic materials suitable for a band from 100 kHz to several 100 kHz. In FIG. 18, magnetic materials represented by J and K are Co amorphous metal molded into a sheet shape. In the band from 100 kHz to several 100 kHz, the magnetic material J has high permeability characteristics. In a frequency band of 1 MHz or less, the magnetic material K has high permeability characteristics.

In the case where the switching frequency falls within a range from 10 kHz band to 10 MHz band, it is desirable that magnetic materials for the magnetic sheets 11 and 12 are Co amorphous metal, as illustrated in FIG. 18.

The magnetic sheets 11 and 12 are each obtained by dividing the above-mentioned sintered body with a thickness of, for example, 0.05 mm or more and 0.30 mm or less (i.e., from 0.05 mm to 0.30 mm), into pieces of several square mm in advance and molding the divided pieces into a sheet shape, as with the base material layers. For example, the magnetic layer formed of the above-mentioned divided pieces is attached to a PET (polyethylene terephthalate) film or paper sheet with a surface coated with a peeling agent, that is, release paper, with an adhesive sheet therebetween, and the surface of the magnetic layer is coated with the PET film as a protection film. Accordingly, each of the magnetic sheets 11 and 12 is formed. Then, the release paper on each of the magnetic sheets 11 and 12 is peeled off and the resultant magnetic sheets 11 and 12 are attached to the multilayer printed board 10. Accordingly, the planar array winding 101 illustrated in FIG. 1A is configured.

The magnetic sheets 11 and 12 may be obtained by molding silicon rubber or resin material mixed with magnetic powder such as magnetic ferrite powder into a sheet shape.

The switching power supply device according to this embodiment described above achieves operational effects described below.

With operation of high permeability of the magnetic sheets 11 and 12, compact windings having predetermined inductance can be formed.

With the magnetic sheets 11 and 12 functioning as magnetic paths, a magnetic path for magnetic flux generated by a winding can be shortened, and unwanted radiation can thus be reduced.

With an air core structure of a winding itself, the structure of the winding can be simplified, excellent productivity can be achieved, and the cost can be reduced.

There is no need to provide a magnetic core for each winding, and an unseparated magnetic sheet is used. Thus, high productivity can be achieved compared to the case where magnetic bodies for individual windings are used.

With the magnetic sheets 11 and 12 each having a thickness smaller than the multilayer printed board 10, a thin planar array winding can be achieved compared to an inductor with a feature in which a magnetic core is embedded in a multilayer printed board.

Second Embodiment

In a second embodiment, some windings having conductor patterns whose shapes are different from those in the first embodiment will be described.

Figure 6:
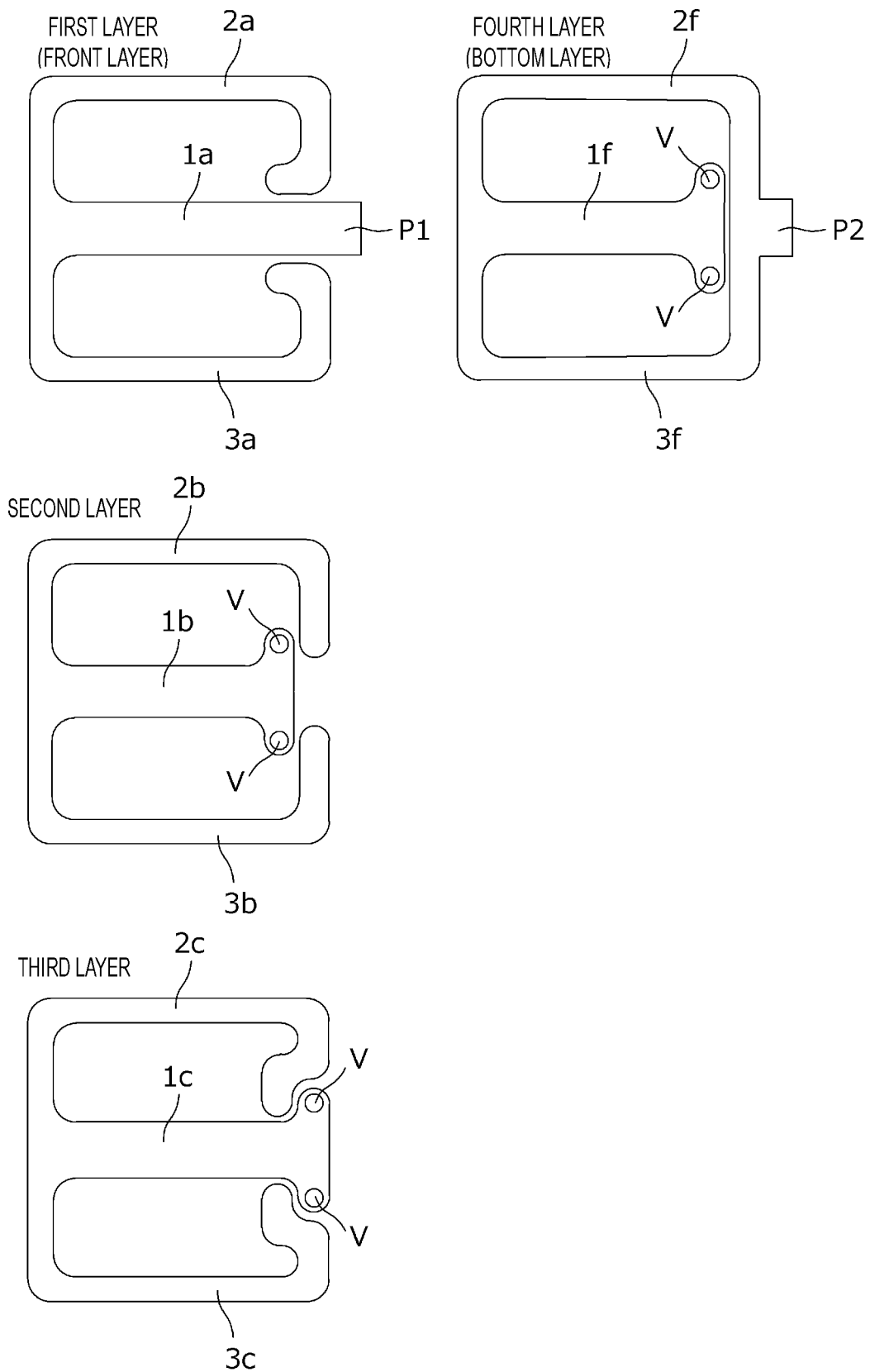
FIG. 6 is an exploded plan view illustrating a structure of a winding of a planar array winding according to a second embodiment.

FIG. 6 is an exploded plan view illustrating a structure of a winding of a planar array winding according to the second embodiment. As in the example illustrated in FIG. 4, only winding conductor patterns formed at individual layers of the multilayer printed board 10 are illustrated in FIG. 6. The winding illustrated in FIG. 6 does not include the fourth layer and the fifth layer illustrated in FIG. 4. That is, one of the winding conductor patterns of the first type formed at the second layer and the fourth layer in FIG. 4 and one of the winding conductor patterns of the second type formed at the third layer and the fifth layer in FIG. 4 are provided.

As described above, the number of laminated conductor patterns may be set in an appropriate manner In FIGS. 4 and 6, the second layer and the third layer form the minimum unit of a repetition period toward the lamination direction. In the case where the number of repetition times of the second and third layers is "0", the winding includes two layers, the front layer and the bottom layer. In the case where the number of repetition times of the second and third layers is "1", the winding includes four layers, as illustrated in FIG. 6. In the case where the number of repetition times of the second and third layers is "2", the winding includes six layers, as illustrated in FIG. 5. The number of repetition times of the second and third layers may be "3" or more.

FIG. 7 is an exploded plan view illustrating another structure of a winding of the planar array winding according to the second embodiment. This example illustrates a case where a multilayer printed board is manufactured using a through-via method. As in the example illustrated in FIG. 6, only winding conductor patterns formed at individual layers of the multilayer printed board are illustrated in FIG. 7.

As illustrated in FIG. 7, the central conductor pattern 1a and the ring-shaped conductor patterns 2a and 3a are formed at the first layer, which is the front layer. In a similar manner, the central conductor pattern 1b and the ring-shaped conductor patterns 2b and 3b are formed at the second layer, the central conductor pattern 1c and the ring-shaped conductor patterns 2c and 3c are formed at the third layer, the central conductor pattern 1d and the ring-shaped conductor patterns 2d and 3d are formed at the fourth layer, and the central conductor pattern 1e and the ring-shaped conductor patterns 2e and 3e are formed at the fifth layer. Furthermore, the central conductor pattern if and the ring-shaped conductor patterns 2f and 3f are formed at the sixth layer, which is the bottom layer.

A plurality of round patterns in FIG. 7 represent through-vias. End portions of the central conductor pattern 1a at the first layer and end portions of the ring-shaped conductor patterns 2b and 3b at the second layer are connected through vias. Furthermore, end portions of the central conductor pattern 1b at the second layer and end portions of the ring-shaped conductor patterns 2c and 3c at the third layer are connected through vias. In a similar manner, end portions of the central conductor pattern 1c at the third layer and end portions of the ring-shaped conductor patterns 2d and 3d at the fourth layer are connected through vias, and end portions of the central conductor pattern 1d at the fourth layer and end portions of the ring-shaped conductor patterns 2e and 3e at the fifth layer are connected through vias. Furthermore, end portions of the central conductor pattern 1e at the fifth layer and end portions of the ring-shaped conductor patterns 2f and 3f at the sixth layer are connected through vias.

The ring-shaped conductor patterns 2a and 3a at the first layer are connected and drawn as the first end P1, and an end portion of the central conductor pattern if at the sixth layer is drawn as the second end P2.

As described above, the planar array winding may be formed at the multilayer printed board using the through-via method.

Third Embodiment

In a third embodiment, an example of a planar array winding having conductor patterns different from those in the first and second embodiments will be described.

Figure 8A:
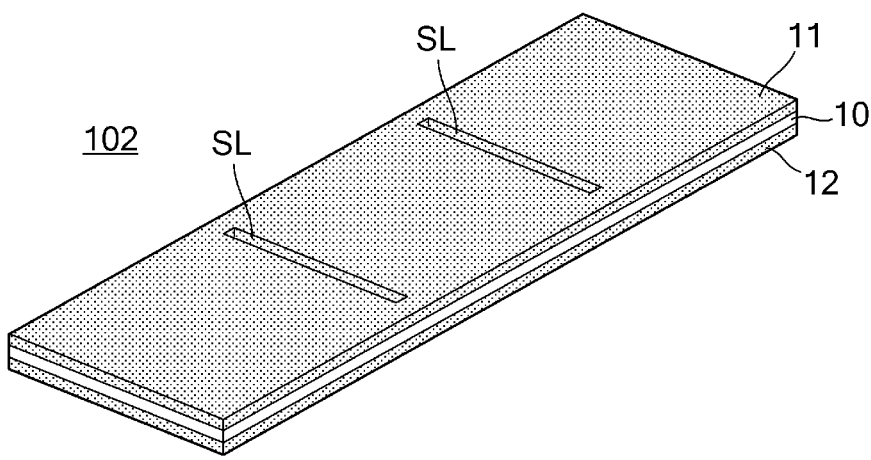
FIG. 8A is a perspective view of a planar array winding provided in a switching power supply device according to a third embodiment.
Figure 8B:
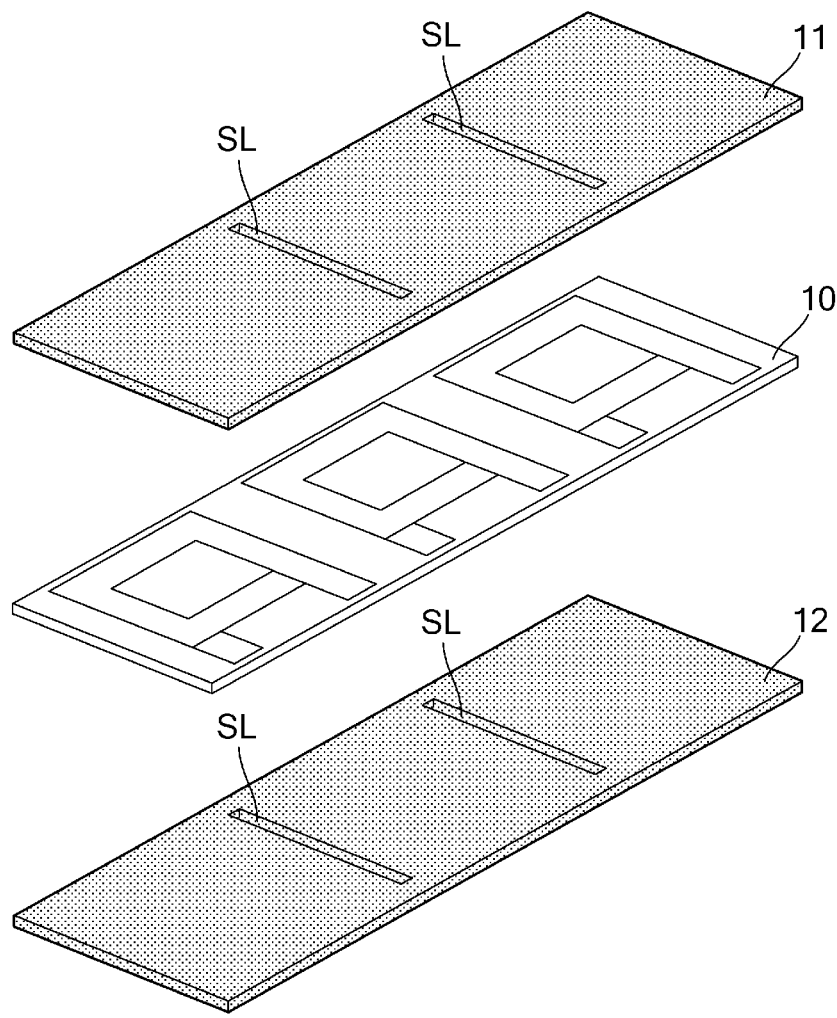
FIG. 8B is an exploded perspective view of the planar array winding.
Figure 9:
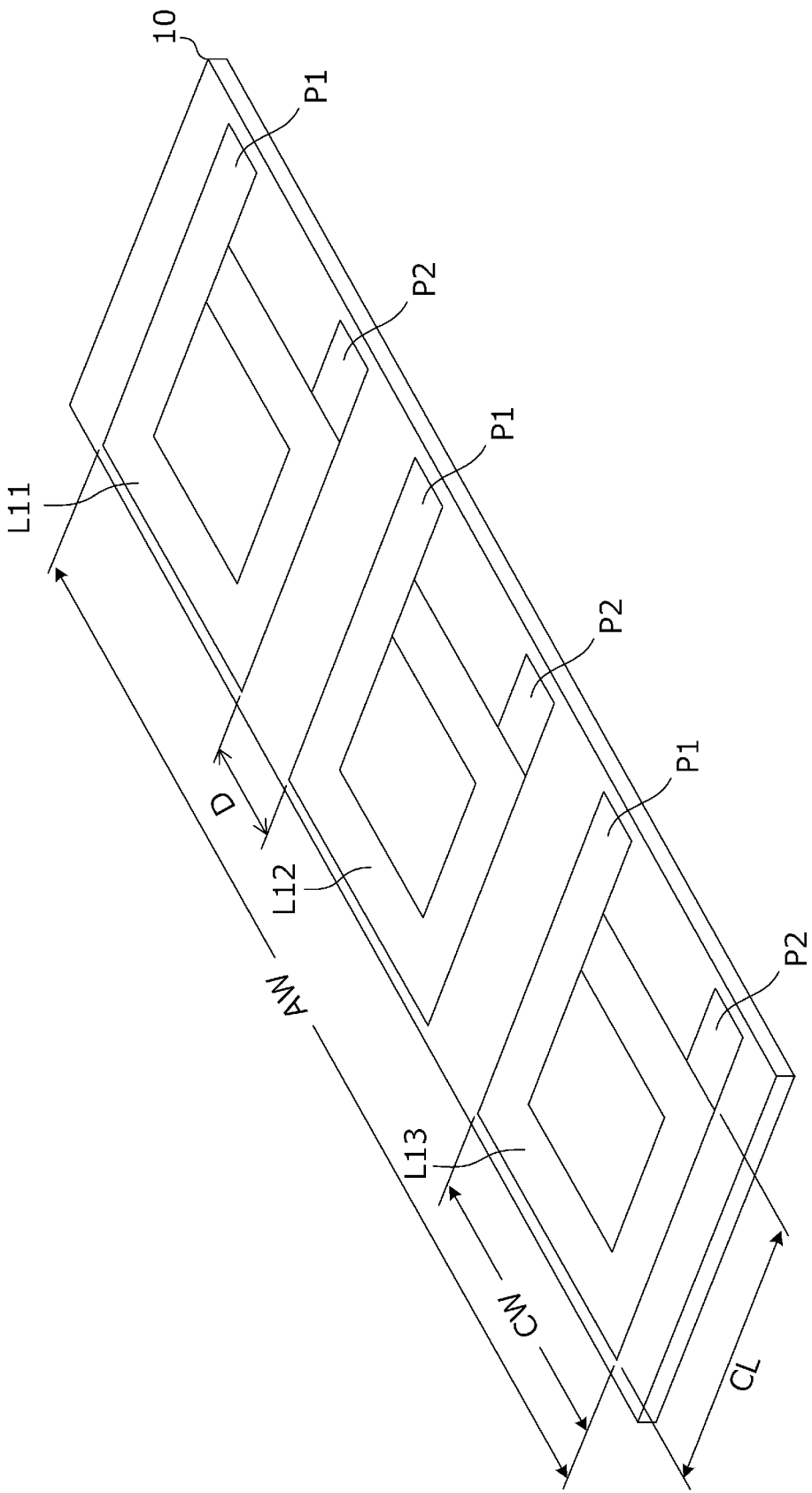
FIG. 9 is a perspective view illustrating patterns of windings formed at the multilayer printed board of the planar array winding.
Figure 10A:
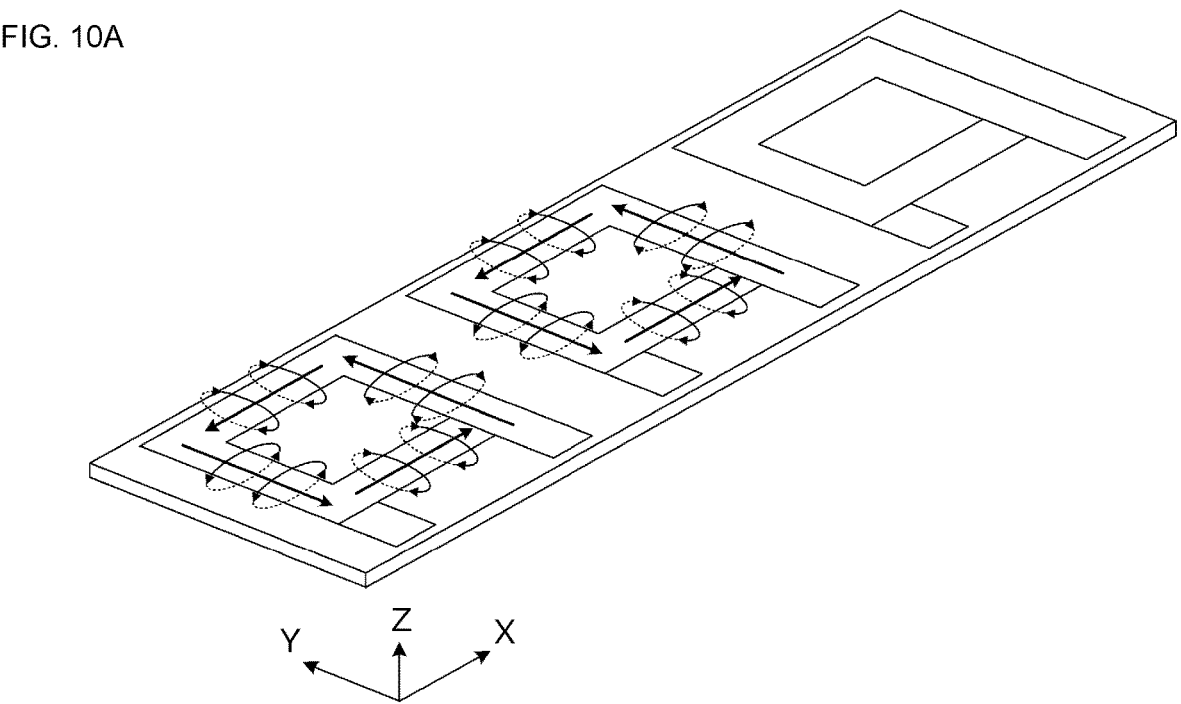
FIG. 10A is a perspective view illustrating a state of current flowing in individual windings of the planar array winding according to the third embodiment and generated magnetic flux.
Figure 10B:
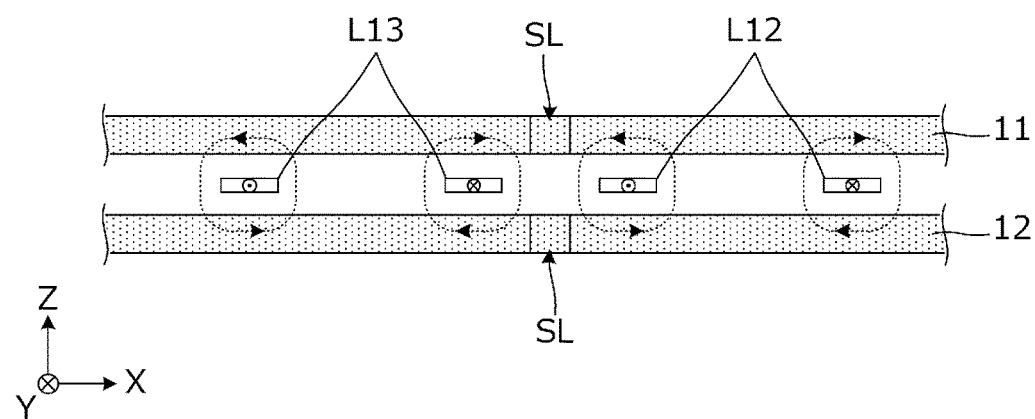
FIG. 10B is a cross-section view of the state illustrated in FIG. 10A.

FIG. 8A is a perspective view of a planar array winding 102 provided in a switching power supply device according to the third embodiment. FIG. 8B is an exploded perspective view of the planar array winding 102. FIG. 9 is a perspective view illustrating patterns of windings formed at the multilayer printed board 10. FIG. 10A is a perspective view illustrating a state of current flowing in individual windings of the planar array winding 102 and generated magnetic flux, and FIG. 10B is a cross-section view of the state illustrated in FIG. 10A. In FIG. 10A, illustration of the magnetic sheets 11 and 12 is omitted. In FIG. 10B, illustration of the multilayer printed board 10 is omitted, and conductor patterns at a single layer are illustrated.

The planar array winding 102 illustrated in FIGS. 8A and 8B includes a plurality of separate windings L11, L12, and L13 formed at the multilayer printed board 10. First ends P1 of the windings L11, L12, and L13 are connected to switching circuit units of a power conversion circuit, and second ends P2 of the windings L11, L12, and L13 are connected to a common output part. The windings L11, L12, and L13 have conductor patterns formed at the multilayer printed board 10 and are arranged along a plane of the multilayer printed board 10. Each of the windings L11, L12, and L13 has a winding opening. The winding openings of adjacent windings are arranged not to overlap. Each of the magnetic sheets 11 and 12 has slits SL at a position between the winding L11 and the winding L12 and a position between the winding L12 and the winding L13. A slit SL corresponds to a "slit-shaped non-magnetic part where no magnetic body is formed" according to the present disclosure.

Sizes and the like of the individual parts illustrated in FIG. 9 are, for example, as described below.

[Conductor Pattern]
Thickness: 0.07 mm
Width CW of winding part: 10 mm
Length CL of winding part: 10 mm
Width AW of all windings: 36 mm
Distance D between winding parts: 2 mm
[Magnetic Sheet]
Relative permeability: 1000
Thickness: 20 µm Straight-line arrows in FIG. 10A and dot symbols and cross symbols in FIG. 10B represent directions of current flowing in the winding parts at certain phases (timings).

As described in this embodiment, each of the windings forming the planar array winding may have a conductor pattern having a winding axis.

Furthermore, as described in this embodiment, with provision of the slits SL at the magnetic sheets 11 and 12, unwanted coupling between adjacent windings can be reduced.

Fourth Embodiment

In a fourth embodiment, an example of a switching power supply device that includes the planar array winding described above will be described.

Figure 11:
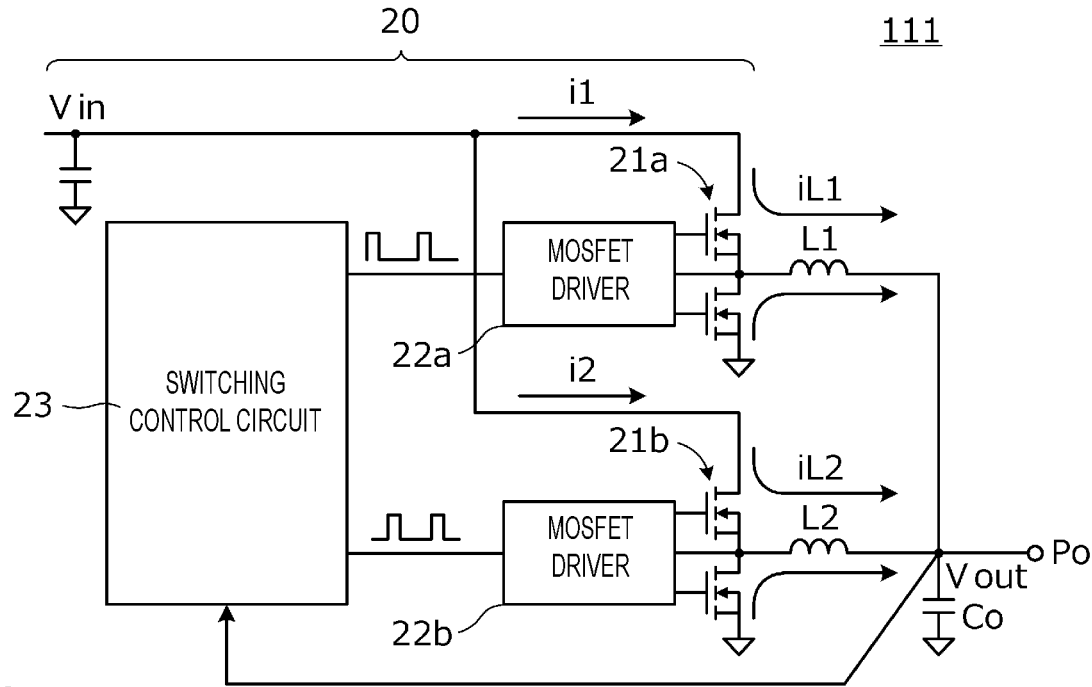
FIG. 11 is a circuit diagram of a switching power supply device according to a fourth embodiment.

FIG. 11 is a circuit diagram of a switching power supply device 111 according to this embodiment. The switching power supply device 111 includes a planar array winding including the windings L1 and L2 and a power conversion circuit 20. Switching circuit units 21a and 21b of the power conversion circuit 20 each include a high-side MOS-FET and a low-side MOS-FET. The first end of the winding L1 is connected to an output part of the switching circuit unit 21a, and the second end of the winding L1 is connected to a common output part Po. The first end of the winding L2 is connected to an output part of the switching circuit unit 21b, and the second end of the winding L2 is connected to the common output part Po. A smoothing capacitor Co is connected to the output part Po.

A driving circuit 22a is connected between the gate and source of the MOS-FETs of the switching circuit unit 21a, and a driving circuit 22b is connected between the gate and source of the MOS-FETs of the switching circuit unit 21b.

A switching control circuit 23 is connected to the driving circuits 22a and 22b. The switching control circuit 23 outputs driving signals of two phases with a phase difference of 180 degrees to the driving circuits 22a and 22b.

Figure 12:
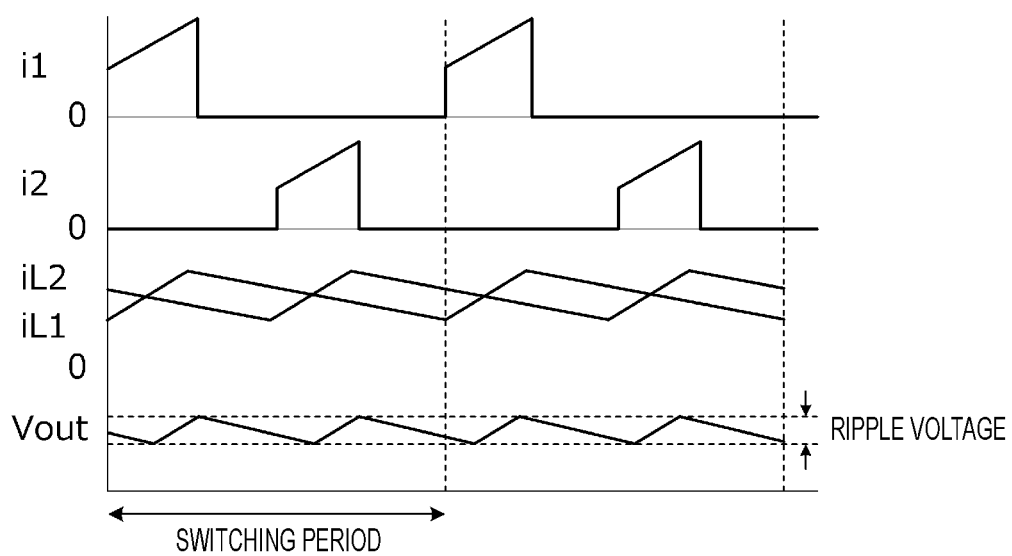
FIG. 12 is a waveform diagram of voltage and current in individual units of the switching power supply device illustrated in FIG. 11.

FIG. 12 is a waveform diagram of voltage and current in individual units of the switching power supply device illustrated in FIG. 11. In FIG. 12, voltage Vin represents input voltage. Current i1 represents input current flowing to the switching circuit unit 21a, and current i2 represents input current flowing to the switching circuit unit 21b. Furthermore, current iL1 represents current flowing in the winding L1, and current iL2 represents current flowing in the winding L2. Voltage Vout represents output voltage of the output part Po.

The phase difference in the waveform of current between the input currents i1 and i2 is 180 degrees, and the phase difference in waveform between current flowing in the winding L1 and current flowing in the winding L2 is also 180 degrees. In the example illustrated in FIGS. 11 and 12, the switching power supply device of two phases including two windings is provided. Thus, during a switching period, two sets of switching operation are performed, and the waveform of two excitation currents in winding current can be obtained.

Figure 13:
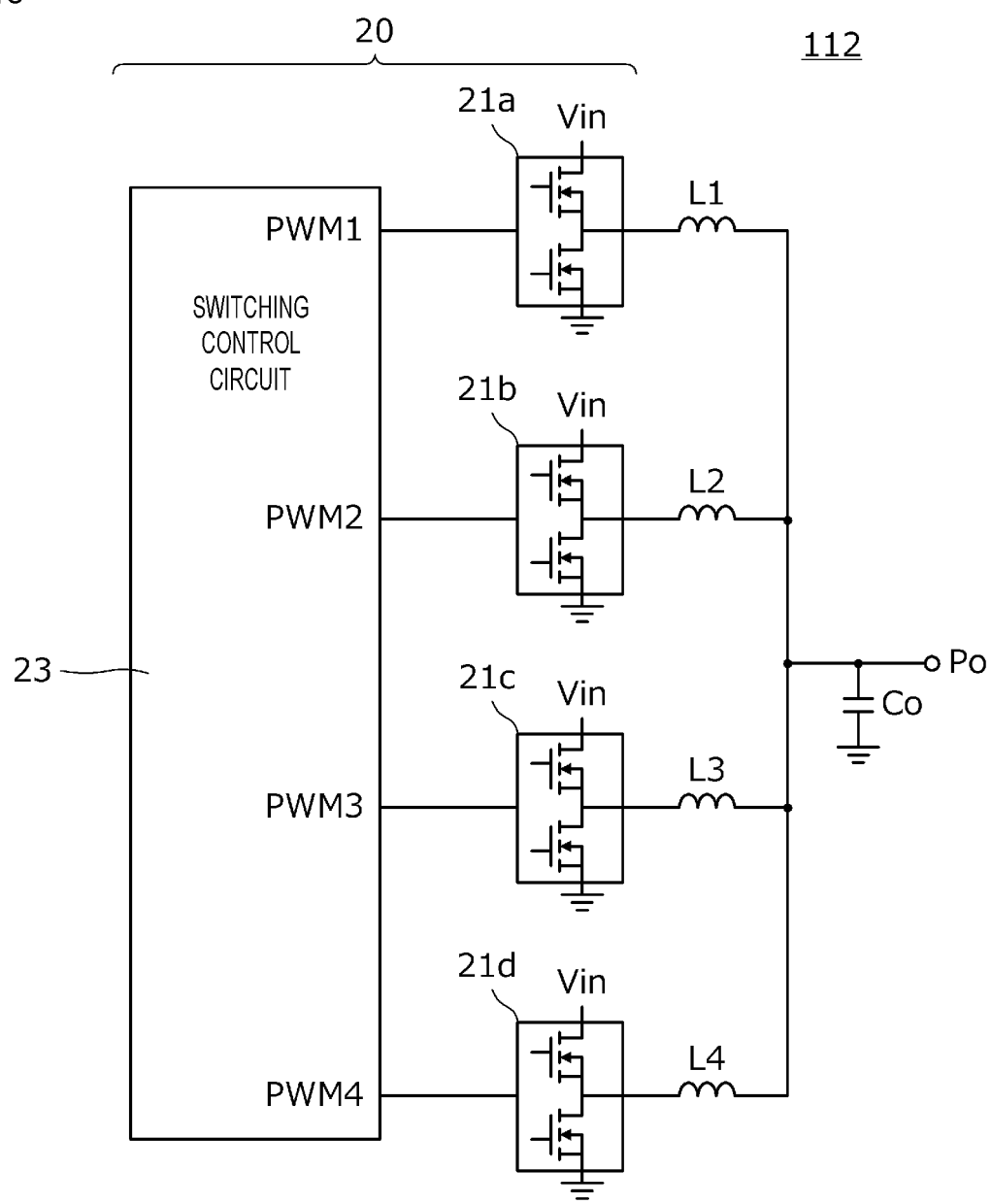
FIG. 13 is a circuit diagram of another switching power supply device according to the fourth embodiment that includes a planar array winding in which four windings are formed and a power conversion circuit.

FIG. 13 is a circuit diagram of another switching power supply device 112 according to the fourth embodiment that includes a planar array winding in which four windings L1, L2, L3, and L4 are formed and the power conversion circuit 20. Switching circuit units 21a, 21b, 21c, and 21d of the power conversion circuit 20 each include a high-side MOS-FET and a low-side MOS-FET. First ends of the windings L1, L2, L3, and L4 are connected to output parts of the switching circuit units 21a, 21b, 21c, and 21d, respectively, and second ends of the windings L1, L2, L3, and L4 are connected to a common output part Po.

Driving circuits, which are not illustrated in FIG. 13, are connected to the switching circuit units 21a, 21b, 21c, and 21d, and output parts (PWM1, PWM2, PWM3, and PWM4) are connected to the driving circuits for the switching control circuit 23. The switching control circuit 23 outputs, via the output parts (PWM1, PWM2, PWM3, and PWM4), driving signals of four phases with a phase difference of 90 degrees to the driving circuits.

As described above, with the switching power supply device of four phases, the phase difference in waveform between input currents flowing to the switching circuit units 21a, 21b, 21c, and 21d is 90 degrees, and the phase difference in waveform between currents flowing in the windings L1, L2, L3, and L4 is also 90 degrees. Thus, during a switching period, four sets of switching operation are performed, and the waveform of four excitation currents in winding current can be obtained.

The switching control circuit 23 illustrated in FIG. 13 is a multi-phase PWM controller and can also control the number of switching circuit units to be used, out of the plurality of switching circuit units 21a to 21d, according to the size of a load. That is, the switching control circuit 23 operates in a single phase when the load is minimum, operates in four phases when the load is maximum, and operates in two phases or three phases when the load is medium.

Figure 14:
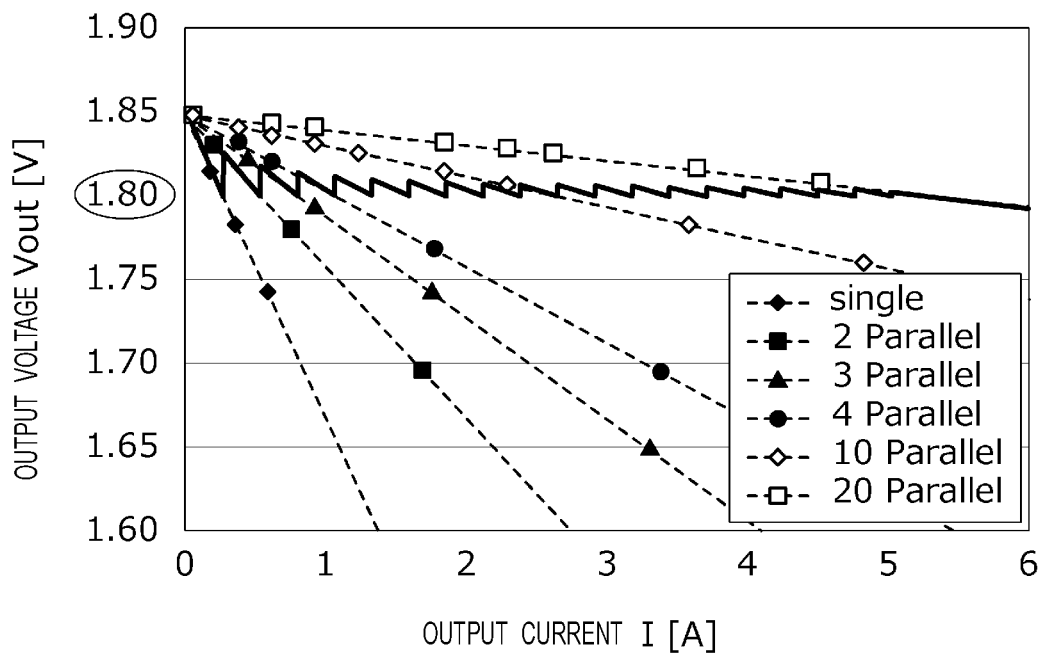
FIG. 14 is a diagram illustrating the relationship between output current and output voltage in the case where the number of switching circuit units that perform parallel control varies depending on the size of a load.

FIG. 14 is a diagram illustrating the relationship between output current and output voltage in the case where the number of switching circuit units that perform parallel control varies depending on the size of a load. In this example, the number of switching circuit units that perform parallel control in the case where the load is minimum is one (single-phase control), and the number of switching circuit units that perform parallel control in the case where the load is maximum is twenty (20-phase control).

In the example of FIG. 14, the number of switching circuit units that perform parallel control is set to minimum without the output voltage Vout dropping below 1.8 V. In the case where the ON duty ratio is represented by D, the input voltage is represented by Vin, the number of switching circuit units that perform parallel control is represented by N, a resistance component of a switching circuit unit and a winding is represented by r, and the output current is represented by I, the relationship of Vout=D·Vin−(r/N)I is obtained. Thus, by controlling the number N of switching circuit units that perform parallel control according to the size of the load, substantially a constant output voltage Vout can be achieved. That is, by varying the number N of switching circuit units that perform parallel control depending on the size of the load, stopping an unwanted switching circuit unit, and reducing the number of switching circuit units, switching loss and driving loss of a switching circuit unit can be reduced, and efficiency of the power conversion circuit can be increased.

Figure 15:
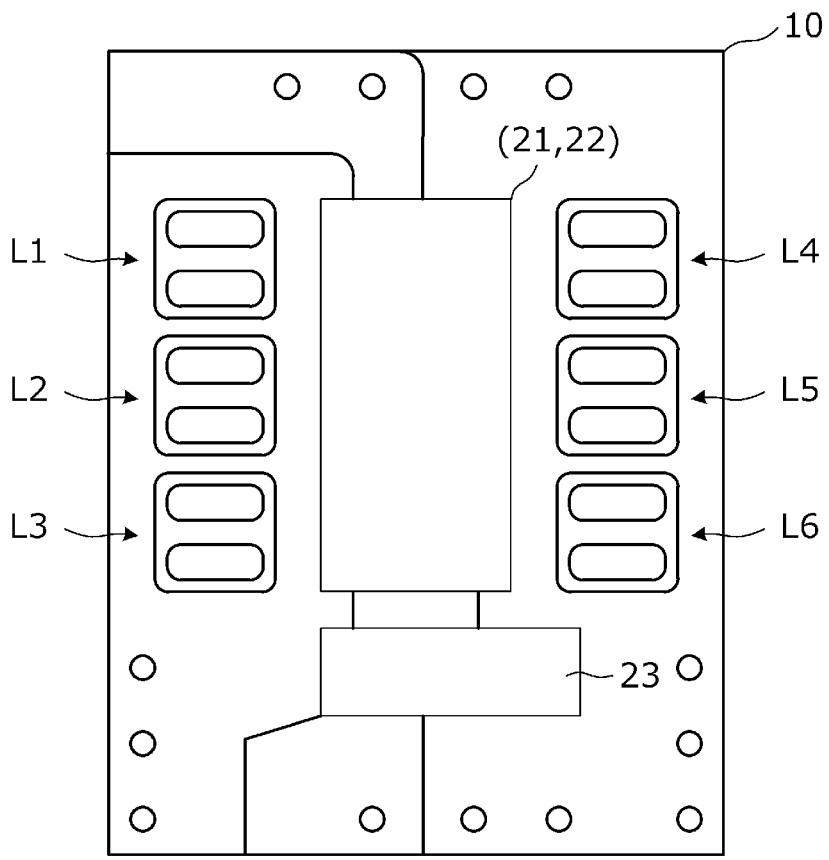
FIG. 15 is a plan view illustrating an example of configuration on a circuit board of a switching power supply device according to the fourth embodiment.

Next, an example of configuration on the circuit board of the switching power supply device according to this embodiment will be described. FIG. 15 is a plan view of the switching power supply device formed at the multilayer printed board 10. A magnetic sheet of substantially the same size as the multilayer printed board 10 is provided on each of the upper face and the lower face of the multilayer printed board 10. However, in FIG. 15, the switching power supply device without the magnetic sheets is illustrated.

Windings L1, L2, L3, L4, L5, and L6 are formed at the multilayer printed board 10. The windings L1, L2, and L3 form a planar array winding, and the windings L4, L5, and L6 form another planar array winding. Conductor patterns of the windings L1, L2, L3, L4, L5, and L6 are illustrated in a simplified manner. The configuration of the planar array windings including the plurality of windings is the same as that illustrated in FIG. 2 and so on. A switching circuit unit 21 and a driving circuit 22 are provided between the two planar array windings. The configuration of the switching circuit unit 21 is the same as those of the switching circuit units 21a to 21d illustrated in FIGS. 11 and 13. The configuration of the driving circuit 22 is the same as those of the driving circuits 22a and 22b illustrated in FIG. 11. A switching control circuit 23 is provided near the switching circuit unit 21 and the driving circuit 22.

As described above, a switching power supply device that includes a planar array winding in which the distance between adjacent windings is reduced so that a plurality of windings are arranged in a limited space at a board can be configured.

The switching power supply device according to this embodiment described above achieves operational effects described below.

Because the position and the time at which magnetic flux generated by a plurality of windings reaches the maximum magnetic flux density varies periodically, apparent operating frequency is increased, and the sizes of a smoothing capacitor and windings can be reduced. Furthermore, excellent high-speed load response can be achieved.

Because the position and the time at which magnetic flux generated by a plurality of windings reaches the maximum magnetic flux density varies periodically, magnetic saturation of the magnetic sheets 11 and 12 can be reduced.

Because the position and the time at which magnetic flux generated by a plurality of windings reaches the maximum magnetic flux density varies periodically, heat generation parts of windings and the magnetic sheets 11 and 12 can be dispersed, and peak of heat generation can be reduced.

The thickness MT of a magnetic sheet satisfies the relationship of MT≥W/(2μ'), based on the dimensional relationship among the opening width W of a winding part, the relative permeability μ' of the magnetic sheet, and the thickness MT of the magnetic sheet, by taking into consideration the magnetic flux density of magnetic flux generated around a conductor pattern of the winding part by current flowing to the conductor pattern of the winding part. Thus, the thickness and size can be reduced. In particular, by setting the thickness MT of the magnetic sheet to approximately W/(2μ'), a thinner inductor can be achieved, and a thinner switching power supply device can thus be achieved.

It should be understood that the embodiments described above are illustrative and non-restrictive in every respect. Changes and modifications can be made in an appropriate manner by those skilled in the art. The scope of the present disclosure is defined by the scope of the claims, not by the embodiments described above, and is intended to include any modification to an embodiment within the scope and meaning equivalent to the scope of the claims.

For example, in each of the embodiments described above, an example in which the magnetic sheets 11 and 12 are provided on upper and lower faces of the multilayer printed board 10 is described. However, only one of the magnetic sheets 11 and 12 may be provided.

Furthermore, in each of the embodiments described above, an example in which the magnetic sheets 11 and 12 each having the same size as the multilayer printed board 10 are provided is described. However, the magnetic sheets 11 and 12 may each have a size covering only a region of the multilayer printed board 10 where windings are formed.

What is claimed is:

1. A switching power supply device comprising:
    a power conversion circuit that is provided at a multilayer printed board and includes a plurality of switching circuits and a controller configured to control the plurality of switching circuits;
    a plurality of windings that are at the multilayer printed board, each of the plurality of windings configuring an inductor having a first end and a second end; and
    a magnetic sheet that is provided on one or both of an upper face of the multilayer printed board and a lower face of the multilayer printed board, the magnetic sheet being made of a soft magnetic body configuring a magnetic layer,
    wherein
    the plurality of windings have conductor patterns at the multilayer printed board,
    the plurality of windings are arranged along a plane of the multilayer printed board,
    the first ends of the plurality of windings are connected to the plurality of switching circuits, and the second ends of the plurality of windings are connected to a common output,
    the controller is configured to control the plurality of switching circuits to periodically vary a position and a time at which magnetic flux generated by current flowing to the plurality of windings reaches maximum magnetic flux density,
    the plurality of windings each include two winding parts in which currents flow in opposite rotation directions, and
    the plurality of windings are arranged such that one winding parts of the two winding parts are adjacent to each other.

2. The switching power supply device according to claim 1,
    wherein the magnetic sheet is made of soft ferrite.

3. The switching power supply device according to claim 2, wherein
    the magnetic sheet is made of an Ni—Zn—Cu sintered ferrite material with a maximum relative permeability at a frequency of 10 MHz or more.

4. The switching power supply device according to claim 3, wherein
    a thickness of the magnetic sheet is smaller than a thickness of the multilayer printed board.

5. The switching power supply device according to claim 3, wherein
    the magnetic sheet comprehensively covers the plurality of windings.

6. The switching power supply device according to claim 3, wherein
    the plurality of windings are separate windings, each of the plurality of windings includes a winding opening, and the plurality of windings are arranged at positions such that winding openings of adjacent windings do not overlap.

7. The switching power supply device according to claim 3, wherein
    the plurality of windings are connected to the switching circuits such that operation of the switching circuits causes currents in regions of the adjacent winding parts that extend in parallel to each other to flow in a same direction.

8. The switching power supply device according to claim 2, wherein
    a thickness of the magnetic sheet is smaller than a thickness of the multilayer printed board.

9. The switching power supply device according to claim 2, wherein
    the magnetic sheet comprehensively covers the plurality of windings.

10. The switching power supply device according to claim 2, wherein
    the plurality of windings are separate windings, each of the plurality of windings includes a winding opening, and the plurality of windings are arranged at positions such that winding openings of adjacent windings do not overlap.

11. The switching power supply device according to claim 2, wherein
    the plurality of windings are connected to the switching circuits such that operation of the switching circuits causes currents in regions of the adjacent winding parts that extend in parallel to each other to flow in a same direction.

12. The switching power supply device according to claim 2, wherein
    using a build-up method for forming a plurality of base material layers, the plurality of windings are formed at the multilayer printed board by electrically connecting the conductor patterns formed at the plurality of base material layers.

13. The switching power supply device according to claim 1, wherein
a thickness of the magnetic sheet is smaller than a thickness of the multilayer printed board.

14. The switching power supply device according to claim 13, wherein
the magnetic sheet comprehensively covers the plurality of windings.

15. The switching power supply device according to claim 1, wherein
the magnetic sheet comprehensively covers the plurality of windings.

16. The switching power supply device according to claim 15, wherein
the magnetic sheet includes a slit-shaped non-magnetic part that is absent the magnetic body, the non-magnetic part being configured in a part between adjacent windings among the plurality of windings.

17. The switching power supply device according to claim 1, wherein
the plurality of windings are separate windings, each of the plurality of windings includes a winding opening, and the plurality of windings are arranged at positions such that winding openings of adjacent windings do not overlap.

18. The switching power supply device according to claim 1, wherein
the plurality of windings are connected to the switching circuits such that operation of the switching circuits causes currents in regions of the adjacent winding parts that extend in parallel to each other to flow in a same direction.

19. The switching power supply device according to claim 1, wherein
using a build-up method for forming a plurality of base material layers, the plurality of windings are formed at the multilayer printed board by electrically connecting the conductor patterns formed at the plurality of base material layers.

20. The switching power supply device according to claim 19, wherein
of the plurality of base material layers configuring the multilayer printed board, the conductor patterns configuring the plurality of windings at an intermediate layer sandwiched between a bottom layer and a front layer include conductor patterns of two types, and the conductor patterns of two types are arranged alternately in a lamination direction.

21. A switching power supply device comprising:
a power conversion circuit that is provided at a multilayer printed board and includes a plurality of switching circuits and a controller configured to control the plurality of switching circuits;
a plurality of windings that are at the multilayer printed board, each of the plurality of windings configuring an inductor having a first end and a second end; and
a magnetic sheet that is provided on one or both of an upper face of the multilayer printed board and a lower face of the multilayer printed board, the magnetic sheet being made of a soft magnetic body configuring a magnetic layer,
wherein
the plurality of windings have conductor patterns at the multilayer printed board,
the plurality of windings are arranged along a plane of the multilayer printed board,
the first ends of the plurality of windings are connected to the plurality of switching circuits, and the second ends of the plurality of windings are connected to a common output,
the controller is configured to control the plurality of switching circuits to periodically vary a position and a time at which magnetic flux generated by current flowing to the plurality of windings reaches maximum magnetic flux density, and
the magnetic sheet is made of soft ferrite and an Ni—Zn—Cu sintered ferrite material with a maximum relative permeability at a frequency of 10 MHz or more.

22. A switching power supply device comprising:
a power conversion circuit that is provided at a multilayer printed board and includes a plurality of switching circuits and a controller configured to control the plurality of switching circuits;
a plurality of windings that are at the multilayer printed board, each of the plurality of windings configuring an inductor having a first end and a second end; and
a magnetic sheet that is provided on one or both of an upper face of the multilayer printed board and a lower face of the multilayer printed board, the magnetic sheet being made of a soft magnetic body configuring a magnetic layer,
wherein
the plurality of windings have conductor patterns at the multilayer printed board,
the plurality of windings are arranged along a plane of the multilayer printed board,
the first ends of the plurality of windings are connected to the plurality of switching circuits, and the second ends of the plurality of windings are connected to a common output,
the controller is configured to control the plurality of switching circuits to periodically vary a position and a time at which magnetic flux generated by current flowing to the plurality of windings reaches maximum magnetic flux density,
using a build-up method for forming a plurality of base material layers, the plurality of windings are formed at the multilayer printed board by electrically connecting the conductor patterns formed at the plurality of base material layers, and
of the plurality of base material layers configuring the multilayer printed board, the conductor patterns configuring the plurality of windings at an intermediate layer sandwiched between a bottom layer and a front layer include conductor patterns of two types, and the conductor patterns of two types are arranged alternately in a lamination direction.

* * * * *